US008165552B2

(12) United States Patent
Rofougaran et al.

(10) Patent No.: US 8,165,552 B2
(45) Date of Patent: Apr. 24, 2012

(54) METHOD AND SYSTEM FOR IDENTIFYING RADIO FREQUENCY IDENTIFICATION (RFID) TAG LOCATION USING A SWITCHABLE COIL

(75) Inventors: Ahmadreza Rofougaran, Newport Coast, CA (US); Amin Shameli, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1283 days.

(21) Appl. No.: 11/536,663

(22) Filed: Sep. 29, 2006

(65) Prior Publication Data

US 2008/0090519 A1    Apr. 17, 2008

(51) Int. Cl.
*H04B 1/06* (2006.01)
(52) U.S. Cl. ............... 455/274; 455/178.1; 455/272; 455/275; 343/728; 343/729; 343/737; 343/764; 343/853
(58) Field of Classification Search ............ 455/25, 455/456.1, 13.3, 41.2, 272–274, 178.1
See application file for complete search history.

(56) References Cited

U.S. PATENT DOCUMENTS

| 6,714,120 B2 * | 3/2004 | Blama et al. ............... 340/10.1 |
| 7,623,835 B2 * | 11/2009 | Forster ........................ 455/272 |
| 2005/0266811 A1 | 12/2005 | Weiss |
| 2006/0232419 A1 * | 10/2006 | Tomioka et al. .......... 340/572.7 |

FOREIGN PATENT DOCUMENTS

| KR | 20010078104 | 8/2001 |
| KR | 20030006051 | 1/2003 |
| WO | WO 2006/029082 | 3/2006 |

* cited by examiner

*Primary Examiner* — Charles Appiah
*Assistant Examiner* — Randy Peaches
(74) *Attorney, Agent, or Firm* — Farjami & Farjami LLP

(57) ABSTRACT

Aspects of a method and system for identifying a radio frequency identification (RFID) tag location using a switchable coil are presented. Aspects of the systems may include one or more processors that enable selection of an inductor coil from a plurality of inductor coils. The selection of the inductor coil may be based on a change in an electromagnetic field, with respect to an initial electromagnetic field, as detected by the selected inductor coil. The processors may enable transmission of a signal, having a transmitter frequency in the UHF frequency band, via the selected inductor coil.

21 Claims, 4 Drawing Sheets

METHOD AND SYSTEM FOR IDENTIFYING RADIO FREQUENCY IDENTIFICATION (RFID) TAG LOCATION USING A SWITCHABLE COIL

CROSS-REFERENCE TO RELATED APPLICATIONS/INCORPORATION BY REFERENCE

This application makes reference to:
U.S. application Ser. No. 11/536,678, filed Sep. 29, 2006;
U.S. application Ser. No. 11/536,682, filed Sep. 29, 2006;
U.S. application Ser. No. 11/536,650, filed Sep. 29, 2006;
U.S. application Ser. No. 11/536,644, filed Sep. 29, 2006;
U.S. application Ser. No. 11/536,676, filed Sep. 29, 2006:
U.S. application Ser. No. 11/536,659, filed Sep. 29, 2006;
U.S. application Ser. No. 11/536,673, filed Sep. 29, 2006;
U.S. application Ser. No. 11/536,679, filed Sep. 29, 2006;
U.S. application Ser. No. 11/536,670, filed Sep. 29, 2006;
U.S. application Ser. No. 11/536,672, filed Sep. 29, 2006;
U.S. application Ser. No. 11/536,648, filed Sep. 29, 2006;
U.S. application Ser. No. 11/536,669, filed Sep. 29, 2006;
U.S. application Ser. No. 11/536,666, filed Sep. 29, 2006;
U.S. application Ser. No. 11/536,675, filed Sep. 29, 2006;
U.S. application Ser. No. 11/536,685, filed Sep. 29, 2006;
U.S. application Ser. No. 11/536,645, filed Sep. 29, 2006;
U.S. application Ser. No. 11/536,655, filed Sep. 29, 2006;
U.S. application Ser. No. 11/536,660, filed Sep. 29, 2006;
U.S. application Ser. No. 11/536,657, filed Sep. 29, 2006;
U.S. application Ser. No. 11/536,662, filed Sep. 29, 2006;
U.S. application Ser. No. 11/536,688, filed Sep. 29, 2006;
U.S. application Ser. No. 11/536,667, filed Sep. 29, 2006;
U.S. application Ser. No. 11/536,651, filed Sep. 29, 2006; and
U.S. application Ser. No. 11/536,656, filed Sep. 29, 2006.

The above stated applications are hereby incorporated herein by reference in their entirety.

FIELD OF THE INVENTION

Certain embodiments of the invention relate to wireless communication. More specifically, certain embodiments of the invention relate to a method and system for identifying a radio frequency identification (RFID) tag location using a switchable coil.

BACKGROUND OF THE INVENTION

As portable electronic devices and wireless devices become more popular, an increasing range of mobility applications and services are emerging. There are well established radio broadcast services, utilizing the amplitude modulation (AM) and/or frequency modulation (FM) frequency bands that allow reception of audio information and/or data at an FM receiver.

Radio frequency identification (RFID) is a data collection technology that enables the storing and remote retrieval of data utilizing devices referred to as RFID tags, or transponders. An RFID transponder may comprise a silicon integrated circuit, or chip, and an antenna that enables the RFID transponder to receive and respond to radio frequency (RF) queries from an RFID transceiver, or reader. The RFID transponder may comprise memory, for example a random access memory (RAM) or an electrically erasable programmable read only memory (EEPROM), which enables storage of data. The data may comprise an electronic product code (EPC) that may be utilized to locate an item to which the RFID transponder is attached. For example, libraries may attach RFID transponders to books to enable the tracking of books that are checked out to library patrons. RFID transponders may be integrated into plastic, credit card sized devices referred to as "smart cards." The RFID transponders in smart cards may enable storage of account information that enables the holder of the smart card to purchase goods and services. The smart card, for example, may store a current balance that indicates a monetary value of goods and services that may be purchased with the smart card. The smart card holder may purchase goods and services by holding the smart card in the proximity of an RFID transceiver that retrieves account information from the smart card. The RFID transceiver may, for example, decrease the current balance to reflect purchases and store the updated value in the smart card. The RFID transceiver may also increase the current balance when the user purchases additional monetary value.

Two of the challenges in the development of radio frequency identification (RFID) systems are the inexorable quest to reduce the cost and size of RFID transponder circuits, and the need to provide secure communications environment between communicating RFID systems. However, requirements associated with the design and implementation of passive components may limit the ability to reduce the cost and size of RFID transponder circuits in RFID systems. For example, antennas and/or coupling coils, utilized to enable reception of signals at the RFID transponder circuit, may be too large and bulky to integrate on the same integrated circuit chip with the RFID transponder circuit. Furthermore, circuitry that may enable secure communications based on the use of various data encryption algorithms may require levels of operating power consumption that are not practical for implementation in RFID systems.

Near field communication (NFC) is a communication standard that enables wireless communication devices, such as cellular telephones, SmartPhones, and personal digital assistants (PDAs) to establish peer-to-peer (P2P) networks. NFC may enable electronic devices to exchange data and/or initiate applications automatically when they are brought in close proximity, for example ranging from touching, or 0 cm, to a distance of about 20 cm.

NFC may enable downloading of images stored in a digital camera, to a personal computer, or downloading of audio and/or video entertainment to MP3 devices, or downloading of data stored in a SmartPhone to a personal computer, or other wireless device, for example. NFC may be compatible with smart card technologies and may also be utilized to enable purchase of goods and services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for identifying a radio frequency identification (RFID) tag location using a switchable coil, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for identifying a radio frequency identification (RFID) tag location using a switchable coil. In various embodiments of the invention, an RFID reader may select a current inductor coil from a plurality of inductor coils, which may be utilized for transmitting and/or receiving near field RFID signals having a frequency in the ultra high frequency (UHF) band. An exemplary UHF frequency band may comprise a range of frequencies from about 300 MHz to about 3 GHz. In an exemplary embodiment of the invention, the RFID signals may have a frequency of about 900 MHz. In various embodiments of the invention, RFID systems may communicate based on near field communications (NFC).

The RFID reader may utilize the selected inductor coil to detect the magnitude and/or direction of an electromagnetic field in the immediate vicinity of the RFID reader to determine whether an RFID transponder is located within the immediate vicinity of the RFID reader. If an RFID transponder is located, the RFID reader may utilize the current inductor coil to initiate a near field RFID communication with the RFID transponder. If an RFID transponder is not located, the RFID reader may select a subsequent inductor coil from the plurality of inductor coils, and attempt to locate an RFID reader by utilizing a method substantially similar to that described above. Accordingly, switching among a plurality of coil increases that probability that a coil in the immediate vicinity of the RFID reader may be detected.

Figure 1:
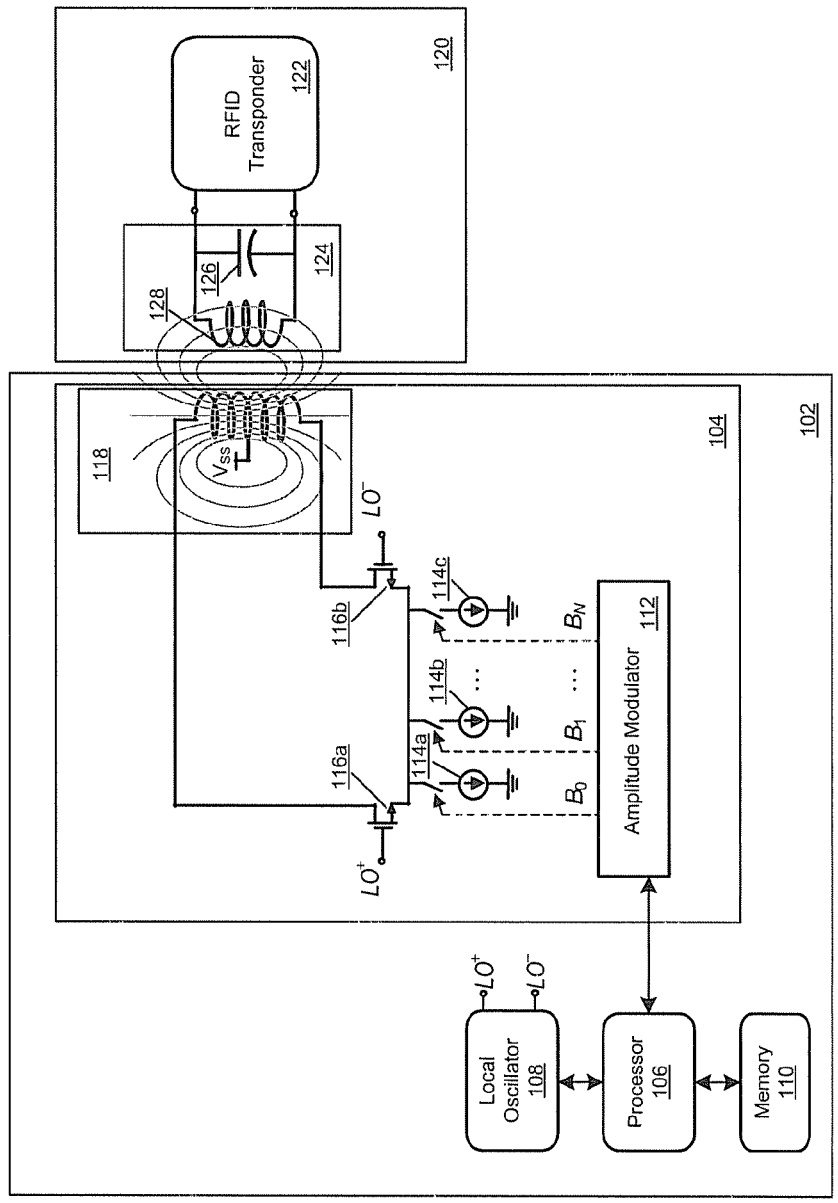
FIG. 1 is a block diagram of an exemplary near field UHF RFID system, in accordance with an embodiment of the invention.

FIG. 1 is a block diagram of an exemplary near field UHF RFID system, in accordance with an embodiment of the invention. Referring to FIG. 1, there is shown an RFID reader 102, and a single chip RFID transponder circuit 120. The RFID reader 102 may comprise a power amplifier 104, a processor 106, a local oscillator 108, and memory 110. The power amplifier 104 may comprise an amplitude modulator 112, a plurality of current sources 114a, 114b, . . . , and 114c, a plurality of transistors 116a, and 116b, and an inductor 118. The single chip RFID transponder circuit 120 may comprise an RFID transponder block 122, and an inductor coil 124. The inductor coil 124 may comprise at least one capacitor 126, and at least one inductor 128.

The RFID reader 102 may comprise suitable logic, circuitry, and/or code that may enable generation and transmission of data via an RFID signal having a frequency within the UHF frequency band. The RFID reader 102 may enable the data to be represented as symbols, where the symbols may be transmitted via the RFID signal. A symbol may comprise a group of data bits. The RFID reader 102 may generate a symbol by generating a current, the magnitude of which may be proportional to the magnitude of a binary word formed each the group of bits. The symbol may be modulated based on a local oscillator signal having a frequency that may be approximately equal to the frequency of the corresponding transmitted RFID signal. The RFID reader 102 may transmit the data via the RFID signal by generating an electromagnetic field, the magnitude and/or direction of which may vary based on the portion of the data contained within each transmitted symbol.

The RFID reader 102 may receive data via a received RFID signal by detecting variations in the magnitude and/or direction of an electromagnetic field in the immediate vicinity of the RFID reader 102. Based on the detected variations within the electromagnetic field, the RFID reader 102 may generate a current signal, the magnitude of which may vary with time based on the magnitude and/or direction of the electromagnetic field at corresponding time instants. The RFID reader 102 may demodulate the current signal based on the local oscillator signal to generate a plurality of received symbols. Based on the magnitude of each received symbol, the RFID reader 102 may detect one or more bits contained in the received data.

The processor 106 may comprise suitable logic, circuitry, and/or code that may enable generation of data to be transmitted of RFID signals and/or processing of data contained in received RFID signals. The processor 106 may generate groups of bits that may be utilized to form symbols, where the symbols may be utilized to generate transmitted RFID signals. The processor 106 may also enable selection of transmitting frequencies that may be utilized to generate RFID signals. The processor 106 may enable detection of bits from received RFID signals.

The local oscillator 108 may comprise suitable logic, circuitry, and/or code that may enable generation of a local oscillator signal. The local oscillator signal may be utilized to modulate data that may be transmitted via RFID signals. The local oscillator 108 may enable generation of RFID signals having a frequency in the UHF frequency band. In an exemplary embodiment of the invention, the local oscillator 108 may enable generation of signals having a frequency of about 900 MHz. The local oscillator 108 may generate differential local oscillator signals $LO^+$ and $LO^-$.

The memory 110 may comprise suitable logic, circuitry, and/or code that may enable storage, and/or retrieval of information, data, and/or code. The memory 110 may enable storage and/or retrieval of data that may be received or transmitted by the RFID reader 102 in a near field RFID communication. The memory 110 may comprise a plurality of random access memory (RAM) technologies such as, for example, DRAM, and/or nonvolatile memory, for example electrically erasable programmable read only memory (EEPROM).

The power amplifier 104 may enable reception of a group of bits, $B_0, B_1, \ldots$ and $B_N$, which may be utilized to generate symbols. Each symbol may comprise a plurality of signal amplitude levels wherein each amplitude level may correspond to a specific binary combination of bits $B_0, B_1, \ldots,$ and $B_N$. The symbols may be modulated, based on a local oscillator signal, to generate an RFID signal having a frequency within the UHF frequency band. The power amplifier 104 may enable transmission of the RFID signal by inducing variations in the magnitude and/or direction of an electromagnetic field in the immediate vicinity of the RFID reader 102.

The power amplifier 104 may enable reception of RFID signals by generating an electromagnetic field in the immediate vicinity of the RFID reader 102. The power amplifier 104 may enable detection of variations in the magnitude and/or direction of the electromagnetic field. Based on the variations in the magnitude and/or direction of the electromagnetic field, the power amplifier 104 may enable detection of received RFID signals. The power amplifier 104 may detect individual symbols received via the received RFID signals, from received groups of bits may be detected. The detection of bits from the received RFID signal may enable the RFID reader 102 to receive data from received RFID signals.

The amplitude modulator 112 may comprise suitable logic, circuitry, and/or code that may enable control of current flow from a plurality of current sources 114a, 114b, ..., and 114c based on a group of bits $B_0, B_1, \ldots$, and $B_N$. The group of bits $B_0, B_1, \ldots$, and $B_N$ may be associated with a symbol, where the symbol comprises at least a portion of the data to be transmitted by the power amplifier 104. For example, for a bit value $B_0=1$, the amplitude modulator 112 may enable closure of a switch controlling the current source 114a, thereby enabling the current source 114a to conduct current. By contrast, for a bit value $B_0=0$, the amplitude modulator 112 may enable opening of a switch controlling the current source 114a, thereby disabling the current source 114a to conduct current. As the number of bits for which the binary value is 1 increases in a group of bits $B_0, B_1, \ldots$, and $B_N$, the total current flow through the plurality of current sources 114a, 114b, ..., and 114c may increase. Consequently, the amplitude associated with the corresponding symbol may also increase. As the number of bits for which the binary value is 0 increases in a group of bits $B_0, B_1, \ldots$, and $B_N$, the total current flow through the plurality of current sources 114a, 114b, ..., and 114c may decrease. Consequently, the amplitude associated with the corresponding symbol may also decrease. In an exemplary embodiment of the invention, N=7 where N is a variable that may indicate a number of bits in the group of bits $B_0, B_1, \ldots$, and $B_N$.

The plurality of transistors 116a, and 116b may form a differential amplifier circuit, which receives differential input signals, LO$^+$ and LO$^-$, from a local oscillator signal. When a differential positive voltage is applied to the inputs of the transistors 116a and 116b, the differential input signals may enable current flow through the transistors 116a and 116b. When a differential negative voltage is applied to the inputs of the transistors 116a and 116b, the differential input signals may disable current flow through the transistors 116a and 116b. When current flow is enabled through the transistors 116a and 116b, a current may flow through the inductor 118, the magnitude is about equal to the magnitude of the aggregate current flow through the plurality of current sources 114a, 114b, ..., and 114c. When current flow is disabled through the transistors 116a and 116b, the magnitude of the current flow through the inductor 118 may be about 0. In this regard, the differential input signals, LO$^+$ and LO$^-$, may enable application of a time varying current signal to the inductor 118.

The application of the time varying current signal may enable the inductor 118 to generate an electromagnetic field in the vicinity of the power amplifier 104. The magnitude and/or direction of the electromagnetic field may correspondingly vary with respect to time in response to variations in the current signal applied to the inductor 118. In various embodiments of the invention, the inductor 118 may comprise one or more inductor coils. Each inductor coil may be realized comprising a loop geometry, which may be characterized by a loop radius, $r_{loop}$.

The single chip RFID transponder circuit 120 may comprise suitable logic, circuitry, and/or code that may enable reception of an RFID signal having a frequency within the UHF frequency band. The single chip RFID transponder circuit 120 may generate operating power from the received RFID signal. The generated operating power may enable the single chip RFID transponder circuit 120 to process the received RFID signal. The single chip RFID transponder circuit 120 may detect data in the received RFID signal. The detected data may comprise a request for account identification information stored within the single chip RFID transponder circuit 120, for example. Based on this data, the single chip RFID transponder circuit 120 may generate response data. The response data may comprise the requested account identification information. The single chip RFID transponder circuit 120 may transmit a signal that may be generated by modulating the response data and a carrier signal having a frequency, which may be approximately equal to a frequency of the received RFID signal.

The RFID transponder block 122 may comprise suitable logic, circuitry, and/or code that may enable selection of a frequency for receiving an RFID signal, and generation of operating power from the received RFID signal. The RFID transponder block 122 may also enable detection of data in the received RFID signal, and generation of response data. The RFID transponder block 122 may enable selection of a frequency for transmitting an RFID signal. A carrier signal may be generated having a frequency, which may be approximately equal to the selected transmitting frequency. In one exemplary embodiment of the invention, the carrier signal may be generated having a frequency, which may be approximately equal to the frequency of the received RFID signal. The RFID transponder block 122 may enable generation of a response signal by modulating the response data and the carrier signal.

The inductor coil 124 may comprise suitable circuitry that may enable reception and/or transmission of RFID signals having a frequency within the UHF frequency band. In an exemplary embodiment of the invention, the inductor coil may enable reception and/or transmission of RFID signals having a frequency of about 900 MHz. The inductor coil 124 may be represented as an equivalent circuit comprising at least one capacitor 126 and at least one inductor 128. In various embodiments of the invention, the capacitor 126 and inductor 128 may form a resonant circuit for which the resonant frequency may be higher than the frequency of RFID signals received and/or transmitted by the inductor coil 124.

In operation, the RFID reader 102 may attempt to determine whether an RFID transponder 120 may be in the immediate vicinity by generating initial an electromagnetic field. The initial electromagnetic field may correspond to a measured impedance of the wireless medium in the immediate vicinity of the RFID reader 102, $Z_{air}$. As an RFID transponder 120 approaches the immediate vicinity, the impedance associated with the RFID transponder 120 may modify the measured impedance in the vicinity of the RFID reader 102. Consequently, the approaching RFID transponder 120 may induce changes in the electromagnetic field from the initial electromagnetic field. The change may be observed through variations in the magnitude and/or direction of the electromagnetic field induced by the approaching RFID transponder 120. Based on these variations, the RFID reader 102 may be able to locate an RFID transponder 120 in the immediate vicinity of the RFID reader 102. Upon locating the RFID transponder 120, the RFID reader 102 may initiate near field RFID communication. The RFID reader 102 may initiate the communication by transmitting data to the RFID transponder 120 via one or more RFID signals.

The processor 106 may enable selection of a transmitting frequency, and may enable configuration of the local oscillator 108 to enable generation of differential local oscillator signals LO⁺ and LO⁻ having a frequency within the UHF frequency band. Upon detection of the RFID transponder 120, the processor 106 may retrieve data stored in the memory 110. The retrieved data bits may be communicated to the amplitude modulator 112. The processor 106 may communicate control signals to the power amplifier 104, which enable the power amplifier 104 to generate RFID signals that may be utilized for transmitting the data bits. The current applied to the inductor 118 when the power amplifier 104 is transmitting data via an RFID signal may generate an electromagnetic field that is detected by the inductor coil 124 when the single chip RFID transponder circuit 120 is receiving the transmitted RFID signal. The variation in current magnitude within the inductor 118 may induce a corresponding variation in current magnitude in the inductor 128. The variation in current magnitude within the inductor 128 may enable the inductor 128 and capacitor 126 to generate a corresponding voltage. The magnitude of the corresponding voltage may be based on the variation in current magnitude induced in the inductor 128. The generated voltage may be applied to the inputs of the RFID transponder block 122. Based on the magnitude of the generate voltage, the RFID transponder block 122 may detect a symbol within the received RFID signal, from which corresponding bits associated with the symbol may be detected.

The single chip RFID transponder circuit 120 may transmit an RFID signal by generating a signal that controls a switch within the RFID transponder block 122. When the switch is opened, the impedance measured across the terminals of the RFID transponder block 122 may be referred to as $Z_{transponder}$. In this regard, the impedance of the single chip RFID transponder circuit 120, $Z_{open}$, may have a value that is determined by the impedance of the inductor 128, the capacitor 126, and the impedance $Z_{transponder}$. When the switch is closed, the impedance measured across the terminals of the RFID transponder block 122 may correspond to a short circuit, for which the impedance may be about equal to 0. In this regard, the impedance of the single chip RFID transponder circuit 120, $Z_{closed}$, may have a value that may be determined by the impedance of the inductor 128, the capacitor 126, and the short circuit impedance of the RFID transponder block 122. The signal, which controls the switch within the RFID transponder block 122 may have a frequency about equal to the selected transmitting frequency for the RFID signal transmitted by the single chip RFID transponder circuit 120.

The opening and closing of the switch may enable the RFID transponder block 122 to modulate response data with a carrier signal to generate an RFID signal that is transmitted to the RFID reader 102. For example, opening of the switch may enable the RFID transponder block 122 to transmit a bit having a binary value of 0, while closing of the switch may enable the RFID transponder block 122 to transmit a bit having a binary value of 1.

When receiving an RFID signal, the power amplifier 104 may generate a current that may be applied to the inductor 118. The applied current may generate an electromagnetic field as described above. The magnitude and/or direction of the electromagnetic field may vary in response to the impedance of the single chip RFID transponder circuit 120. Thus, changes in the impedance of the single chip RFID transponder circuit 120 may induce changes in the magnitude and/or direction of the electromagnetic field generated by the power amplifier 104. Changes in the electromagnetic field may induce changes in the current flow through the inductor 118. By detecting the changes in the current flow through the inductor 118 induced by changes in the impedance of the single chip RFID transponder circuit 120, the power amplifier may detect bits transmitted by the single chip RFID transponder circuit 120. For example, the power amplifier 104 may detect a bit having a binary value of 1 when the impedance of the single chip RFID transponder 120 may be approximately equal to $Z_{closed}$. For example, the power amplifier 104 may detect a bit having a binary value of 0 when the impedance of the single chip RFID transponder 120 may be approximately equal to $Z_{open}$.

In various embodiments of the invention, the ability to generate higher current levels across the inductor 118 may enable greater sensitivity at the RFID reader 102. The greater sensitivity may enable the RFID reader 102 to locate an RFID transponder 120 in the immediate vicinity. As the current through the inductor 118 is increased, and the sensitivity of the RFID reader 102 correspondingly increases, the RFID reader 102 may be able to locate RFID transponders 120 for increasing distances between the inductor 118 and the inductor coil 124. As shown in FIG. 1, the inductor 118 may be placed at the output of the power amplifier 104 to enable the generation of high current levels in response to relatively low supply voltage levels, labeled $V_{SS}$ in FIG. 1. When the voltage amplitude across the terminals of the inductor 118 is about 1V, the root mean square (RMS) current level through the inductor 118 may be about 400 mA.

For an inductor 118 that comprises a single inductor coil characterized by a loop radius, $r_{loop}$, a maximum distance, $d_{max}$, may be defined between the inductor 118 and the inductor coil 124. The maximum distance $d_{max}$ may represent a maximum distance for which an RFID reader 102 may locate an RFID transponder 120. In various embodiments of the invention in which the inductor 118 may comprise a single inductor coil, the maximum distance may be represented as shown in the following equation:

$$r_{loop} \cong \sqrt{2} \cdot d_{max} \qquad \text{Equation [1]}$$

Under some conditions, however, placing the RFID transponder 120 in the immediate vicinity of the RFID reader 102 may not be sufficient to enable the RFID reader to locate the RFID transponder 120. When the inductor 118 comprises a single inductor coil, for example, the RFID reader 102 and RFID transponder 120 may need to be precisely aligned to allow the inductor 118, and the inductor coil 124 to be in sufficiently close proximity to enable the RFID reader to locate the RFID transponder 120. Some users, however, may not be aware of the precise location of the inductor 118 within the RFID reader, and/or the inductor coil 124 within the RFID transponder 124.

Figure 2:
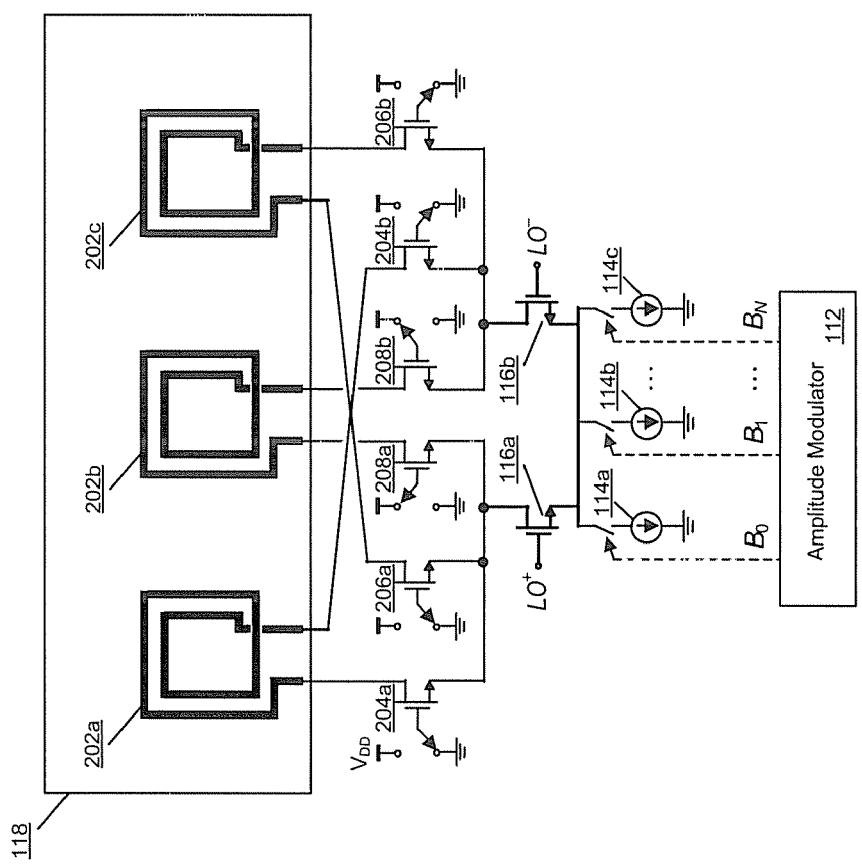
FIG. 2 is diagram of exemplary inductor coil switching circuitry, in accordance with an embodiment of the invention.

FIG. 2 is diagram of exemplary inductor coil switching circuitry, in accordance with an embodiment of the invention. Referring to FIG. 2, there is shown, an amplitude modulator 112, a plurality of current sources 114a, 114b, . . . , and 114c, a plurality of transistors 116a, 116b, 204a, 204b, 206a, 206b, 208a, and 208b, and an inductor 118. The inductor 118 may comprise a plurality of inductor coils 202a, 202b, and 202c. The amplitude modulator 112, plurality of current sources 114a, 114b, . . . , and 114c, and plurality of transistors 116a, and 116b were previously described in regard to FIG. 1.

FIG. 2 shows an inductor 118, which comprises 3 inductor coils 202a, 202b, and 202c. Each of the inductor coils 202a, 202b, and 202c may be characterized by corresponding loop radii $r_{loop1}$, $r_{loop2}$, and $r_{loop3}$, respectively. In an exemplary embodiment of the invention, each of the loop radii may be approximately equal to $r_{loop}$. Each of the inductor coils may detect an inductor coil 124 located at a distance $d_{max}$ in accordance with equation [1].

In various embodiments of the invention, the plurality of inductor coils 202a, 202b, and 202c may enable an RFID reader 102 to detect an RFID transponder 120 over a larger proximate area than may be the case for an RFID reader 102 in which the inductor 118 comprises a single inductor coil 202a.

In operation, the processor 106 may enable a RFID reader 102 to implement a scanning procedure to locate an RFID transponder 120. The scanning procedure may initiate automatically, or in response to an input from a user. In one aspect of the scanning procedure, the processor 106 may enable selection of an inductor coil from the plurality of inductor coils 202a, 202b, and 202c. The processor 106 may select an inductor coil by sending control signals to the transistors 204a, 204b, 206a, 206b, 208a, and 208b. For example, the processor 106 may select inductor coil 202a by sending control signals, which couple the gate inputs of the transistors 204a and 204b to a supply voltage, labeled as $V_{DD}$ in FIG. 2, while coupling the gate inputs of the transistors 206a, 206b, 208a, and 208b to ground (GND). The power amplifier 104 may apply a current to the selected inductor coil, for example 202a. The processor 106 may then attempt to determine whether an RFID transponder 120 has been detected. If an RFID transponder 120 has been detected, the inductor coil 202a may be utilized to initiate a near field RFID communication.

If an RFID transponder 120 has not been detected, the processor 106 may enable selection of a different inductor coil from the plurality of inductor coils 202a, 202b, and 202c. The processor 106 may select inductor coil 202b. The processor 106 may select inductor coil 202b by sending control signals, which couple the gate inputs of the transistors 208a and 208b to a supply voltage, labeled as $V_{DD}$ in FIG. 2, while coupling the gate inputs of the transistors 204a, 204b, 206a, and 206b to ground (GND). The processor 106 may again attempt to determine whether an RFID transponder 120 has been detected. If an RFID transponder 120 has been detected, the inductor coil 202b may be utilized to initiate a near field RFID communication.

If an RFID transponder 120 has not been detected, the processor 106 may select inductor coil 202c. The processor 106 may select inductor coil 202c by sending control signals, which may couple the gate inputs of the transistors 206a and 206b to a supply voltage, labeled as $V_{DD}$ in FIG. 2, while coupling the gate inputs of the transistors 204a, 204b, 208a, and 208b to ground (GND). The processor 106 may again attempt to determine whether an RFID transponder 120 has been detected. If an RFID transponder 120 has been detected, the inductor coil 202c may be utilized to initiate a near field RFID communication.

Various embodiments of the invention do not impose limitations on the order in which inductor coils may be selected, or on the number of attempts that may be made to locate an RFID transponder utilizing a given inductor coil. For example, in one exemplary embodiment of the invention, inductor coils may be selected in a round robin fashion, in which a different inductor coil is utilized for each attempt to locate an RFID transponder 120 in a first iteration. If an RFID transponder 120 has not be located after each of the inductor coils has been utilized, the procedure may halt until a user of the RFID reader 102 undertakes an action that causes the RFID reader 102 to repeat the procedure in a second iteration. In a second iteration, inductor coils may be selected in the same order, or in a different order in comparison to the first iteration.

In another exemplary embodiment of the invention, inductor coils may also be selected in a round robin fashion in a first iteration. After each of the inductor coils has been utilized with no RFID transponder 120 being located, a second iteration may begin in which each of the inductor coils may be selected in the same order as in the first iteration. The RFID reader 102 may continue iterations in a similar fashion until an RFID transponder 102 is located, or until a user of the RFID reader 102 undertakes an action to halt the procedure. In a subsequent iteration, inductor coils may be selected in the same order, or in a different order in comparison to the preceding iteration.

In another exemplary embodiment of the invention, inductor coils may be selected in a non-round robin fashion, for example in random order. In this case, a given inductor coil may be reselected before each of the other inductor coils has been selected once since the preceding instance with the inductor coil was selected. In an exemplary non-round robin sequent, inductor coil 202a may be selected, followed by selection of inductor coil 202b, followed by reselection of inductor coil 202a, followed by selection of inductor coil 202c. In another exemplary embodiment of the invention, a user may manually select an inductor coil that may be utilized in an attempt to locate an RFID transponder 120.

Figure 3:
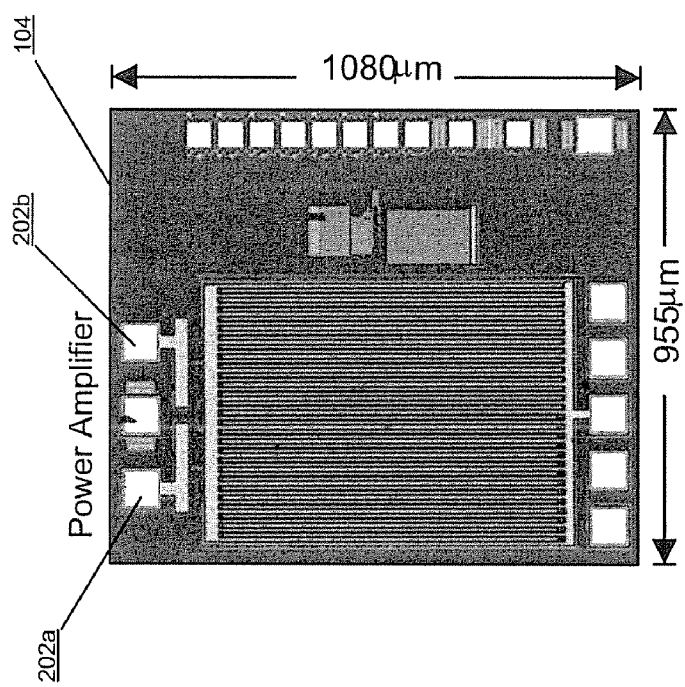
FIG. 3 is a diagram of an exemplary power amplifier circuit comprising a plurality of switchable inductor coils, in accordance with an embodiment of the invention.

FIG. 3 is a diagram of an exemplary power amplifier circuit comprising a plurality of switchable inductor coils, in accordance with an embodiment of the invention. Referring to FIG. 3, there is shown a power amplifier 104. The power amplifier 104 may comprise a plurality of inductor coils 202a, and 202b, for example. The power amplifier 104 may comprise a physical length dimension of about 1,080 μm, and a physical width dimension of about 955 μm. The chip area may be about 1.03 mm$^2$. In an exemplary embodiment of the invention, the power amplifier 104 may be fabricated utilizing a 0.18 μm CMOS manufacturing process. In an exemplary embodiment of the invention, the power amplifier 104 may be fabricated on a printed circuit board (PCB).

Figure 4:
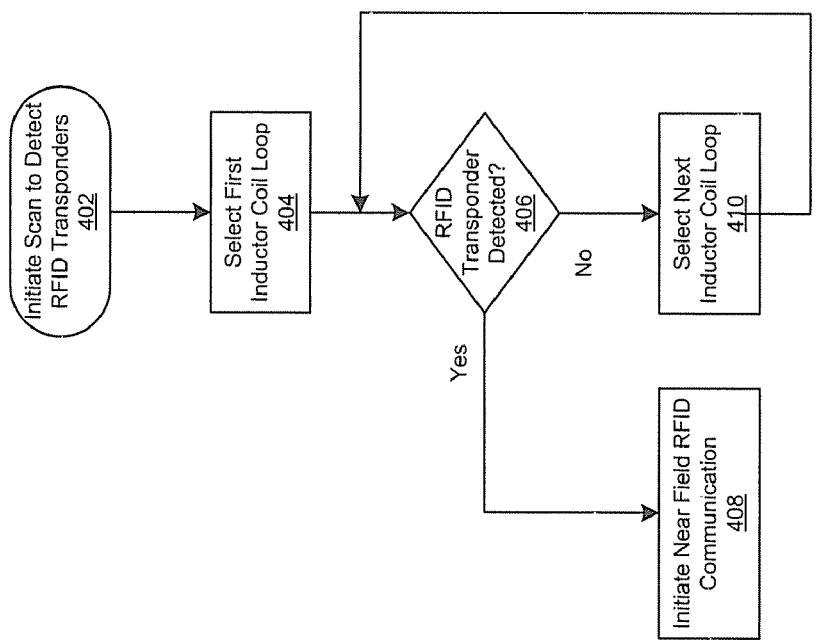
FIG. 4 is a flow chart illustrating exemplary steps for identifying an RFID transponder location utilizing switchable inductor coils, in accordance with an embodiment of the invention.

FIG. 4 is a flow chart illustrating exemplary steps for identifying an RFID transponder location utilizing switchable inductor coils, in accordance with an embodiment of the invention. Referring to FIG. 4, in step 402, a processor 106 may initiate a scan to detect RFID transponders 120 in the immediate vicinity of an RFID reader 102. In step 404, the processor 106 may select a first inductor coil loop 202a, for example. Step 406 may determine whether an RFID transponder 120 has been detected utilizing the selected inductor coil. If an RFID transponder 120 has been located, in step 408, the RFID reader 102 may initiate a near field RFID communication with the located RFID transponder 120. If an RFID transponder 120 has not been located, in step 410, the processor 106 may select a next inductor coil loop 202b, for example. Step 406 may follow step 410.

Aspects of a system for identifying a radio frequency identification (RFID) tag location using a switchable coil may comprise one or more processors 106 that enable selection of an inductor coil from a plurality of inductor coils 202a, 202b, and 202c. The selection of the inductor coil may be based on a change in an electromagnetic field, with respect to an initial electromagnetic field, as detected by the selected inductor coil. The processors 106 may enable transmission of a signal, having a transmitter frequency in the UHF frequency band, via the selected inductor coil. The transmitter frequency may be about 900 MHz.

The processors 106 may enable generation of the initial electromagnetic field via the selected inductor coil. The processors 106 may also enable detection of a magnitude and/or a direction of the electromagnetic field, and detection of a magnitude and/or a direction of the initial electromagnetic field.

The processors 106 may enable detection of the magnitude and/or the direction of the initial electromagnetic field when an impedance, measured from the selected inductor coil, is approximately equal to an impedance of a wireless communications medium in the immediate vicinity of the selected inductor coil. The processors 106 may enable configuration of at least one transistor 204a to select the selected inductor coil. The processors 106 may enable transmission of the transmitted signal via an electromagnetic field generated by the selected inductor coil.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information in a wireless communication system, the method comprising:
   selecting an inductor coil from a plurality of inductor coils based on a change in an electromagnetic field, with respect to an initial electromagnetic field, detected by said selected inductor coil, wherein selecting comprises coupling a non-selected inductor coil, from the plurality of inductor coils, to ground; and
   transmitting a signal, having a transmitter frequency in a radio frequency band, via said selected inductor coil.

2. The method according to claim 1, wherein said transmitter frequency is about 900 MHz.

3. The method according to claim 1, comprising generating said initial electromagnetic field via said selected inductor coil.

4. The method according to claim 1, comprising detecting at least one of: a magnitude and a direction, for said electromagnetic field, and detecting at least one of: a magnitude and a direction for said initial electromagnetic field.

5. The method according to claim 4, comprising detecting said at least one of: said magnitude and said direction for said initial electromagnetic field when an impedance measured from said selected inductor coil is approximately equal to an impedance of a wireless communications medium in an immediate vicinity of said selected inductor coil.

6. The method according to claim 1, comprising configuring at least one transistor to select said selected inductor coil.

7. The method according to claim 1, comprising transmitting said transmitted signal via an electromagnetic field generated by said selected inductor coil.

8. A non-transitory computer-readable medium having stored thereon, a computer program having at least one code section for communicating information in a wireless communication system, the at least one code section being executable by a computer for causing the computer to perform steps comprising:
   selecting an inductor coil from a plurality of inductor coils based on a change in an electromagnetic field, with respect to an initial electromagnetic field, detected by said selected inductor coil, wherein selecting comprises coupling a non-selected inductor coil, from the plurality of inductor coils, to ground; and
   transmitting a signal, having a transmitter frequency in a radio frequency band, via said selected inductor coil.

9. The non-transitory computer-readable medium according to claim 8, wherein said transmitter frequency is about 900 MHz.

10. The non-transitory computer-readable medium according to claim 8, wherein said at least one code section comprises code for generating said initial electromagnetic field via said selected inductor coil.

11. The non-transitory computer-readable medium according to claim 8, wherein said at least one code section comprises code for detecting at least one of: a magnitude and a direction, for said electromagnetic field, and detecting at least one of: a magnitude and a direction, for said initial electromagnetic field.

12. The non-transitory computer-readable medium according to claim 11, comprising detecting said at least one of: said magnitude and said direction for said initial electromagnetic field when an impedance measured from said selected inductor coil is approximately equal to an impedance of a wireless communications medium in an immediate vicinity of said selected inductor coil.

13. The non-transitory computer-readable medium according to claim 8, wherein said at least one code section comprises code for configuring at least one transistor to select said selected inductor coil.

14. The non-transitory computer-readable medium according to claim 8, wherein said at least one code section comprises code for transmitting said transmitted signal via an electromagnetic field generated by said selected inductor coil.

15. A system for communicating information in a wireless communication system, the system comprising:
   at least one processor that enables selection of an inductor coil from a plurality of inductor coils based on a change in an electromagnetic field, with respect to an initial electromagnetic field, detected by said selected inductor coil, wherein the selection comprises coupling a non-selected inductor coil, from the plurality of inductor coils, to ground; and
   said at least one processor enables transmission of a signal, having a transmitter frequency in a radio frequency band, via said selected inductor coil.

16. The system according to claim 15, wherein said transmitter frequency is about 900 MHz.

17. The system according to claim 15, wherein said at least one processor enables generation of said initial electromagnetic field via said selected inductor coil.

18. The system according to claim 15, wherein said at least one processor enables detection of at least one of: a magnitude and a direction for said electromagnetic field, and detection of at least one of: a magnitude and a direction for said initial electromagnetic field.

19. The system according to claim 18, wherein said at least one processor enables detection of said at least one of: said magnitude and said direction for said initial electromagnetic field when an impedance measured from said selected inductor coil is approximately equal to an impedance of a wireless communications medium in an immediate vicinity of said selected inductor coil.

20. The system according to claim 15, wherein said at least one processor enables configuration of at least one transistor to select said selected inductor coil.

21. The system according to claim 15, wherein said at least one processor enables transmission of said transmitted signal via an electromagnetic field generated by said selected inductor coil.

* * * * *